United States Patent
Nishiyama et al.

(10) Patent No.: US 9,665,456 B2
(45) Date of Patent: May 30, 2017

(54) APPARATUS AND METHOD FOR IDENTIFYING A CAUSE OF AN ERROR OCCURRING IN A NETWORK CONNECTING DEVICES WITHIN AN INFORMATION PROCESSING APPARATUS

(71) Applicant: FUJITSU LIMITED, Kawasaki-shi, Kanagawa (JP)

(72) Inventors: Kimihiro Nishiyama, Kawasaki (JP); Keiji Sato, Kunitachi (JP)

(73) Assignee: FUJITSU LIMITED, Kawasaki (JP)

( * ) Notice: Subject to any disclaimer, the term of this patent is extended or adjusted under 35 U.S.C. 154(b) by 66 days.

(21) Appl. No.: 14/726,975

(22) Filed: Jun. 1, 2015

(65) Prior Publication Data
US 2015/0370683 A1 Dec. 24, 2015

(30) Foreign Application Priority Data
Jun. 19, 2014 (JP) .................................. 2014-125994

(51) Int. Cl.
*G06F 11/00* (2006.01)
*G06F 11/30* (2006.01)
(Continued)

(52) U.S. Cl.
CPC .......... *G06F 11/3051* (2013.01); *G06F 11/07* (2013.01); *G06F 11/0709* (2013.01);
(Continued)

(58) Field of Classification Search
CPC ............. G06F 11/3027; G06F 11/3051; G06F 11/2002
See application file for complete search history.

(56) References Cited

U.S. PATENT DOCUMENTS

| 6,557,121 B1 | 4/2003 | McLaughlin et al. |
| 6,853,887 B1 * | 2/2005 | Greenwell ........ H04L 12/40182 701/1 |

(Continued)

FOREIGN PATENT DOCUMENTS

| JP | 11-3294 | 1/1999 |
| JP | 2003-022222 | 1/2003 |
| JP | 2008-225694 | 9/2008 |

OTHER PUBLICATIONS

"Intel® 5520 Chipset and Intel® 5500 Chipset Datasheet" Mar. 2009, 628 pages.

(Continued)

*Primary Examiner* — Charles Ehne
(74) *Attorney, Agent, or Firm* — Oblon, McClelland, Maier & Neustadt, L.L.P.

(57) ABSTRACT

An information processing apparatus includes a plurality of devices, each including a memory that stores link-status information indicating whether or not an error occurs in a link connected to the each device. When a first device among the plurality of devices fails to receive within a predetermined time period a response for a request that has been transmitted by the first device, the first device obtains the link-status information from relevant devices each related to at least one of transfer of the request and transfer of the response, and identifies a link in which the error has occurred or a device that is connected to the link, based on the obtained link-status information.

6 Claims, 12 Drawing Sheets

(51) Int. Cl.
*G06F 13/42* (2006.01)
*G06F 11/20* (2006.01)
*G06F 11/07* (2006.01)
*G06F 11/34* (2006.01)

(52) U.S. Cl.
CPC ...... *G06F 11/0757* (2013.01); *G06F 11/2002* (2013.01); *G06F 11/3027* (2013.01); *G06F 11/3419* (2013.01); *G06F 13/4282* (2013.01)

(56) References Cited

U.S. PATENT DOCUMENTS

| | | | | |
|---|---|---|---|---|
| 2004/0221056 A1* | 11/2004 | Kobayashi | ................ | G06F 3/14 709/232 |
| 2007/0011536 A1* | 1/2007 | Khanna | ................... | G06F 11/27 714/733 |
| 2009/0304002 A1* | 12/2009 | Yu | .......................... | H04L 49/30 370/395.3 |
| 2009/0316574 A1* | 12/2009 | Winter | ................... | H04L 45/00 370/225 |
| 2013/0010588 A1* | 1/2013 | Kretschmann | ....... | G05B 19/058 370/218 |
| 2014/0258790 A1* | 9/2014 | Sorenson | .............. | G06F 11/006 714/48 |

OTHER PUBLICATIONS

"Intel® Core™ i7 Processor Family for the LGA-2011 Socket Datasheet, vol. 2" Nov. 2012, 564 pages.

"PCI Express® Base Specification Revision 3.0" Peripheral Components Interconnect-Special Interest Group, Nov. 10, 2010, 860 pages.

* cited by examiner

FIG. 12

| TIMESTAMP | SEVERITY | LOCATION | ERROR CONTENT |
|---|---|---|---|
| 01/08/2014 23:35 | Uncorrectable | CPU-0_RootPort-1 | Completion Timeout |
| 01/08/2014 23:36 | Correctable | PCIeSwitch-4_Slot-2 | REPLAY_NUM Rollover |
| 01/08/2014 23:36 | Correctable | PCIeSwitch-4_Slot-2_EndDivice | Bad DLLP |
| 01/08/2014 23:36 | Correctable | PCIeSwitch-4_Slot-2_EndDivice | Receiver Error |

APPARATUS AND METHOD FOR IDENTIFYING A CAUSE OF AN ERROR OCCURRING IN A NETWORK CONNECTING DEVICES WITHIN AN INFORMATION PROCESSING APPARATUS

CROSS-REFERENCE TO RELATED APPLICATION

This application is based upon and claims the benefit of priority of the prior Japanese Patent Application No. 2014-125994, filed on Jun. 19, 2014, the entire contents of which are incorporated herein by reference.

FIELD

The embodiments discussed herein are related to apparatus and method for identifying a cause of an error occurring in a network connecting devices within an information processing apparatus.

BACKGROUND

Peripheral Components Interconnect (PCI) Express (hereinafter referred to as PCIe) is an interface standard of serial transfer, which has been formulated by the Peripheral Components Interconnect-Special Interest Group (PCI-SIG).

In the PCIe, conveyance of information between devices is performed by transferring a packet through a network that connects the devices to each other. A device that is a transmission source of a request packet, which is called a transaction layer packet (TLP) request, is called a requester, and a device that is a transmission destination of the TLP request is called a completer. When the requester does not receive a response packet, which is called a TLP completion, from the completer, within a certain time period, a completion timeout is detected in the requester.

A technology is known by which causes of some errors are identified in the PCIe. For example, for an error that occurs in a case of a TLP request that is not supported by the PCIe (that is, "unsupported request error"), the location that has caused the error (in this case, the requester) may be identified based on information that has been written into a header log register provided for a completer.

However, there is no related art in which identification of a cause of a completion timeout is focused on. The completion timeout is detected in the requester, but a log related to the completion timeout is not stored in the header log register. In addition, the completion timeout may be caused by a requester, a completer, or a link or the like on a path between the requester and the completer.

"PCI Express Base Specification Revision 3.0", Peripheral Components Interconnect-Special Interest Group, Nov. 10, 2010, p. 151 is the related art.

Japanese Laid-open Patent Publication No. 2008-225694 is also the related art.

SUMMARY

According to an aspect of the invention, an information processing apparatus includes a plurality of devices, each including a memory that stores link-status information indicating whether or not an error occurs in a link connected to the each device. When a first device among the plurality of devices fails to receive within a predetermined time period a response for a request that has been transmitted by the first device, the first device obtains the link-status information from relevant devices each related to at least one of transfer of the request and transfer of the response, and identifies a link in which the error has occurred or a device that is connected to the link, based on the obtained link-status information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 12 is a diagram illustrating an example of data that is to be output, according to an embodiment.

DESCRIPTION OF EMBODIMENTS

Figure 1:
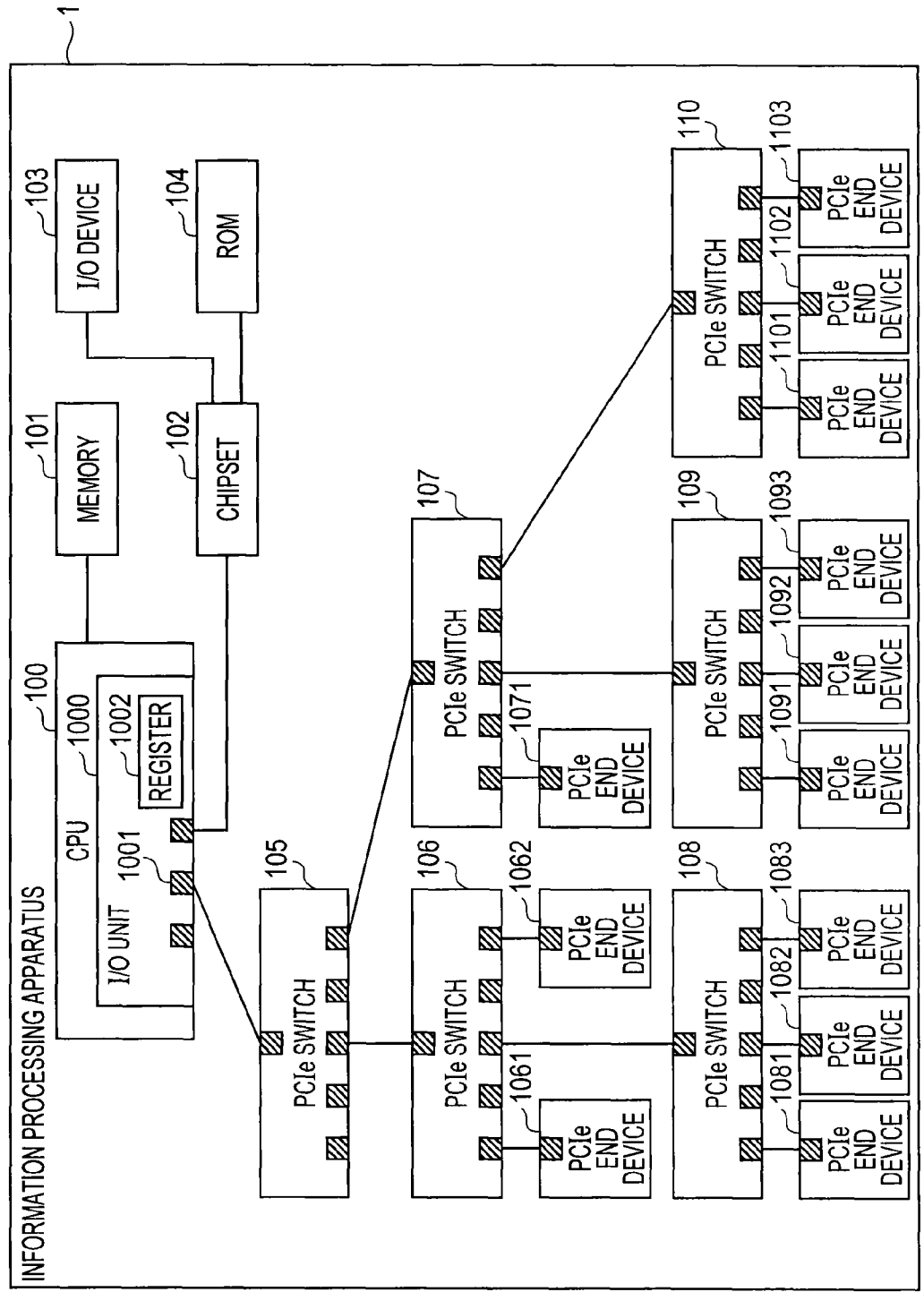
FIG. 1 is a diagram illustrating an example of a hardware configuration of an information processing apparatus, according to an embodiment.

FIG. 1 is a diagram illustrating an example of a hardware configuration of an information processing apparatus, according to an embodiment. The information processing apparatus 1 includes a CPU 100; a memory 101; a chipset 102 including a chip into which a bus bridge, a peripheral circuit, and the like are integrated; an input/output (I/O) device 103; and a read only memory (ROM). The CPU 100 includes an I/O unit 1000 including a plurality of ports and a register 1002. The I/O unit 1000 is, for example, the Integrated I/O, or the like of Intel Corp., and functions of I/Os are aggregated into the I/O unit 1000. In FIG. 1, the port is indicated by the shaded square.

The memory 101 is connected to the CPU 100. In addition, the chipset 102 is connected to one of the ports of the I/O unit 1000. The I/O device 103 and the ROM 104 are connected to the chipset 102.

One of the ports of the I/O unit 1000 (in this case, a port 1001) is connected to a PCIe device. In the following description, the port 1001 is referred to as a route port (see the appendix for the PCIe).

A PCIe switch 105 is connected to the route port 1001. A PCIe switch 106 and a PCIe switch 107 are connected to the PCIe switch 105. The PCIe switch is a device that performs relay and the like of data.

PCIe end devices 1061 and 1062, and a PCIe switch 108 are connected to the PCIe switch 106. PCIe end devices 1081 to 1083 are connected to the PCIe switch 108. The PCIe end device is, for example, a PCIe card or the like.

A PCIe end device 1071 and PCIe switches 109 and 110 are connected to the PCIe switch 107. PCIe end devices 1091 to 1093 are connected to the PCIe switch 109. PCIe end devices 1101 to 1103 are connected to the PCIe switch 110.

As described above, the PCIe devices are connected to each other in a tree shape by using the route port 1001 as a starting point. It is assumed that the tree includes a plurality of layers, and the level of a layer rises as the layer gets closer to the route port 1001.

Figure 2:
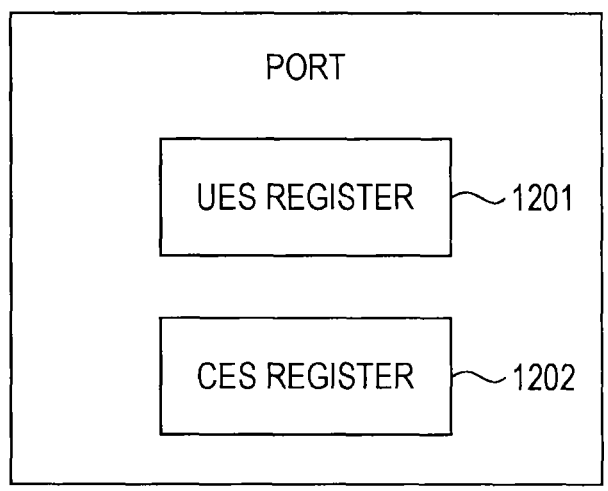
FIG. 2 is a diagram illustrating an example of a configuration of a port in an information processing apparatus, according to an embodiment.

FIG. 2 is a diagram illustrating an example of a configuration of a port in an information processing apparatus, according to an embodiment. The port includes an uncorrectable error status register (hereinafter referred to as a UES register) 1201 in which a value related to an error that is uncorrectable by the PCIe device is stored, and a correctable error status register (hereinafter referred to as a CES register) 1202 in which a value related to an error that is correctable by the PCIe device is stored.

Figure 3:
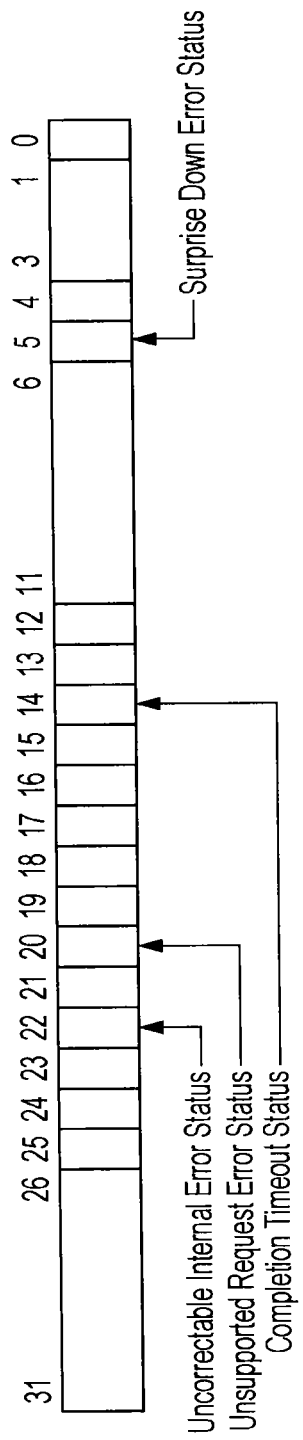
FIG. 3 is a diagram illustrating an example of a configuration of a UES register, according to an embodiment.

FIG. 3 is a diagram illustrating an example of a configuration of a UES register, according to an embodiment. In the UES register 1201 illustrated in the example of FIG. 3, a value of "Surprise Down Error Status", a value of "Uncorrectable Internal Error Status", a value of "Unsupported Request Error Status", and a value of "Completion Timeout Status" are stored. These values are set at a certain value (for example, at 1) when an error has actually occurred. In the UES register 1201, values related to other errors that are uncorrectable by the PCIe device are also stored, but the description thereof is omitted herein because the other errors are not directly related to the embodiment.

Figure 4:
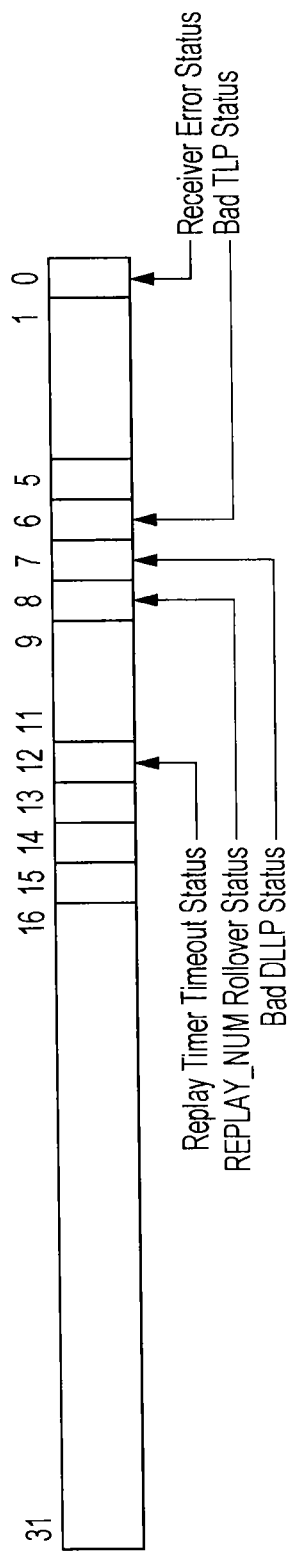
FIG. 4 is a diagram illustrating an example of a configuration of a CES register, according to an embodiment.

FIG. 4 is a diagram illustrating an example of a configuration of a CES register, according to an embodiment. In the CES register 1202 illustrated in the example of FIG. 4, a value of "Receiver Error Status", a value of "Bad TLP Status", a value of "Replay Timer Timeout Status", a value of "REPLAY_NUM Rollover Status", and a value of "Bad DLLP Status" are stored. These values are set at a certain value (for example, at 1) when an error has actually occurred. In the CES register 1202, values related to other errors that are correctable by the PCIe device are also stored, but the description thereof is omitted herein because the other errors are not directly related to the embodiment.

Figure 5:
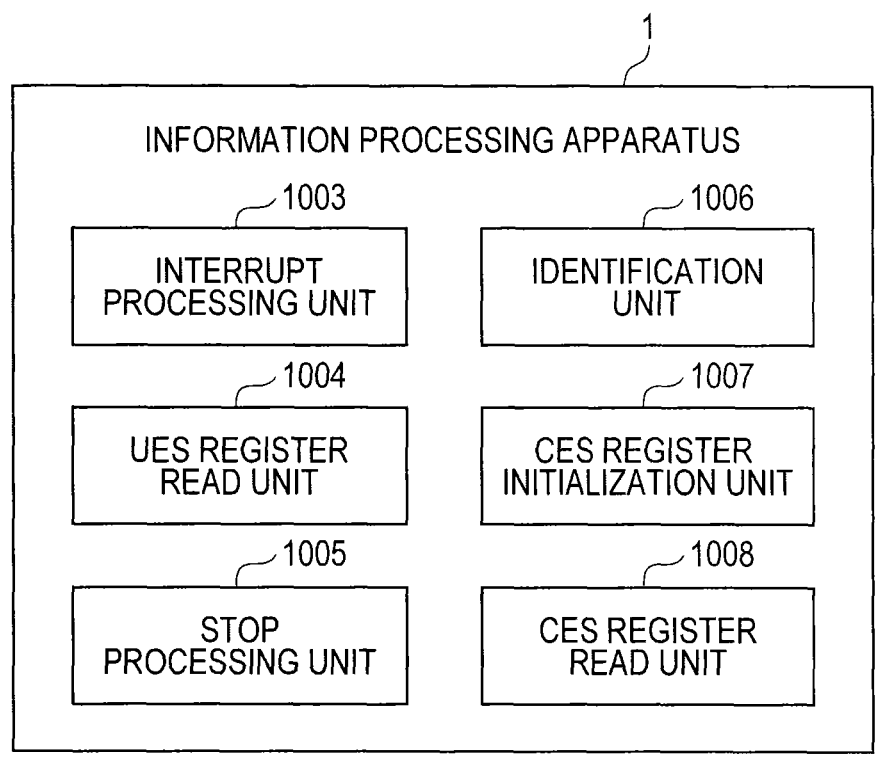
FIG. 5 is a diagram illustrating an example of a functional configuration of an information processing apparatus, according to an embodiment.

A program that is used to execute processing in the embodiment is included, for example, in firmware, and stored in the ROM 104. The program that is used to execute the processing in the embodiment is read from the ROM 104 to the memory 101 when the program is executed by the CPU 100. FIG. 5 is a diagram illustrating an example of a functional configuration of an information processing apparatus, according to an embodiment. In the example of FIG. 5, the information processing apparatus 1 includes an interrupt processing unit 1003, a UES register read unit 1004, a stop processing unit 1005, an identification unit 1006, a CES register initialization unit 1007, and a CES register read unit 1008.

When an interrupt to the CPU 100 has occurred, the interrupt processing unit 1003 requests the UES register read unit 1004 to start the processing. The UES register read unit 1004 reads values from all of the UES registers 1201 in the information processing apparatus 1, in response to the request from the interrupt processing unit 1003, and notifies the identification unit 1006 of the values. The identification unit 1006 executes processing of identifying a cause of the error, in response to the notification from the UES register read unit 1004. In addition, when the error that has occurred is a completion timeout error, the identification unit 1006 requests the CES register initialization unit 1007 to start the processing. The CES register initialization unit 1007 initializes all of the CES registers 1202 in the information processing apparatus 1 (here, sets a value that is used to indicate that an error does not occur (for example, 0)), in response to the request from the identification unit 1006, and requests the CES register read unit 1008 to start the processing. When a certain time period (for example, one second) has elapsed since the CES register read unit 1008 received the request from the CES register initialization unit 1007, the CES register read unit 1008 reads values from all of the CES registers 1202 in the information processing apparatus 1, and notifies the identification unit 1006 of the values. The identification unit 1006 executes processing of identifying a cause of the completion timeout error, in response to the notification from the CES register read unit 1008, and requests the stop processing unit 1005 to start the processing. The stop processing unit 1005 executes processing for stopping an operation of the information processing apparatus 1, in response to the request from the identification unit 1006.

Description will be given of the notification of an error. In the embodiment, the bits of a device control register and a route control register for each of the PCIe devices are set in advance so that each PCIe device notifies the upper level device of an error that has been detected in the each PCIe device or a PCIe device whose level is lower than that of the each PCIe device. For example, the bit of "Error Reporting Enable" of the device control register is set at "1" in advance, and the bit of "System Error Enable" of the route control register is set at "1" in advance. This allows a TLP, which is used to perform notification of an error, to be transferred to the I/O unit 1000. The detail of the error notification in the PCIe is described in "6.2.6. Error Message Controls" of "PCI Express Base Specification Revision 3.0" (For example, http://www.pcisig.com/specifications/pciexpress/base3/).

When it is detected that an uncorrectable error has occurred in the route port 1001 or the PCIe under the control of the route port 1001, through a TLP that is used to perform notification of an error, the I/O unit 1000 causes an interrupt to the CPU 100 to occur. The interrupt that is caused to occur by the I/O unit 1000 is described, for example, in "Intel 5520 Chipset and Intel 5500 Chipset Datasheet" of Intel Corp. (for example, http://www.intel.com/content/www/us/en/chipsets/5520-5500-chipset-ioh-datasheet.html, or http://www.intel.com/content/dam/www/public/us/en/documents/datasheets/55 20-5500-chipset-ioh-datasheet.pdf). In the embodiment, when an uncorrectable error has occurred, for example, it is set in advance that a hardware interrupt, which is called a System Management Interrupt (SMI), is caused to occur. The detail of the setting of the hardware interrupt is described, for example, in "Intel Core i7Processor Family for the LGA-2011 Socket Datasheet, Vol. 2" of Intel Corp. (for example, http://www.intel.com/content/www/us/en/processors/core/core-i7-Iga-2011-datasheet-vol-2.html, or "http://www.intel.com/content/dam/doc/datasheet/core-i7-Iga-2011-datasheet-vol-2.pdf").

The I/O unit 1000 writes identification information or the like of the route port that has received the packet, to the register 1002. The interrupt processing unit 1003, which has been called by the occurrence of the interrupt, reads the information from the register 1002, and detects that an uncorrectable error has occurred in the route port 1001 or the PCIe device under the control of the route port 1001. After that, the interrupt processing unit 1003 notifies the UES register read unit 1004 of the read identification information of the route port while requesting the UES register read unit 1004 to start the processing.

Figure 6:
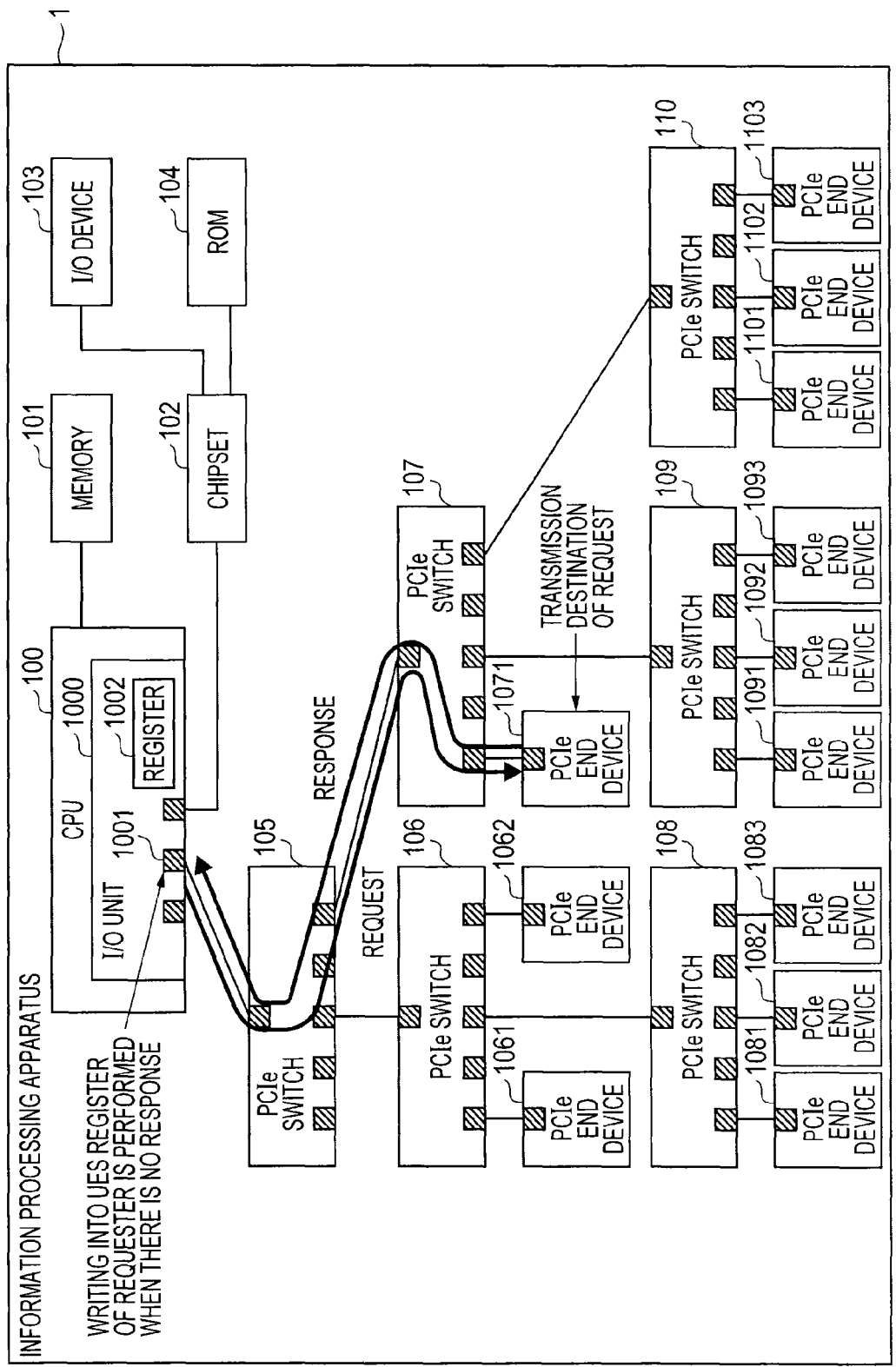
FIG. 6 is a diagram illustrating an example of a relationship between an occurrence of an error and writing into a UES register, according to an embodiment.
Figure 7:
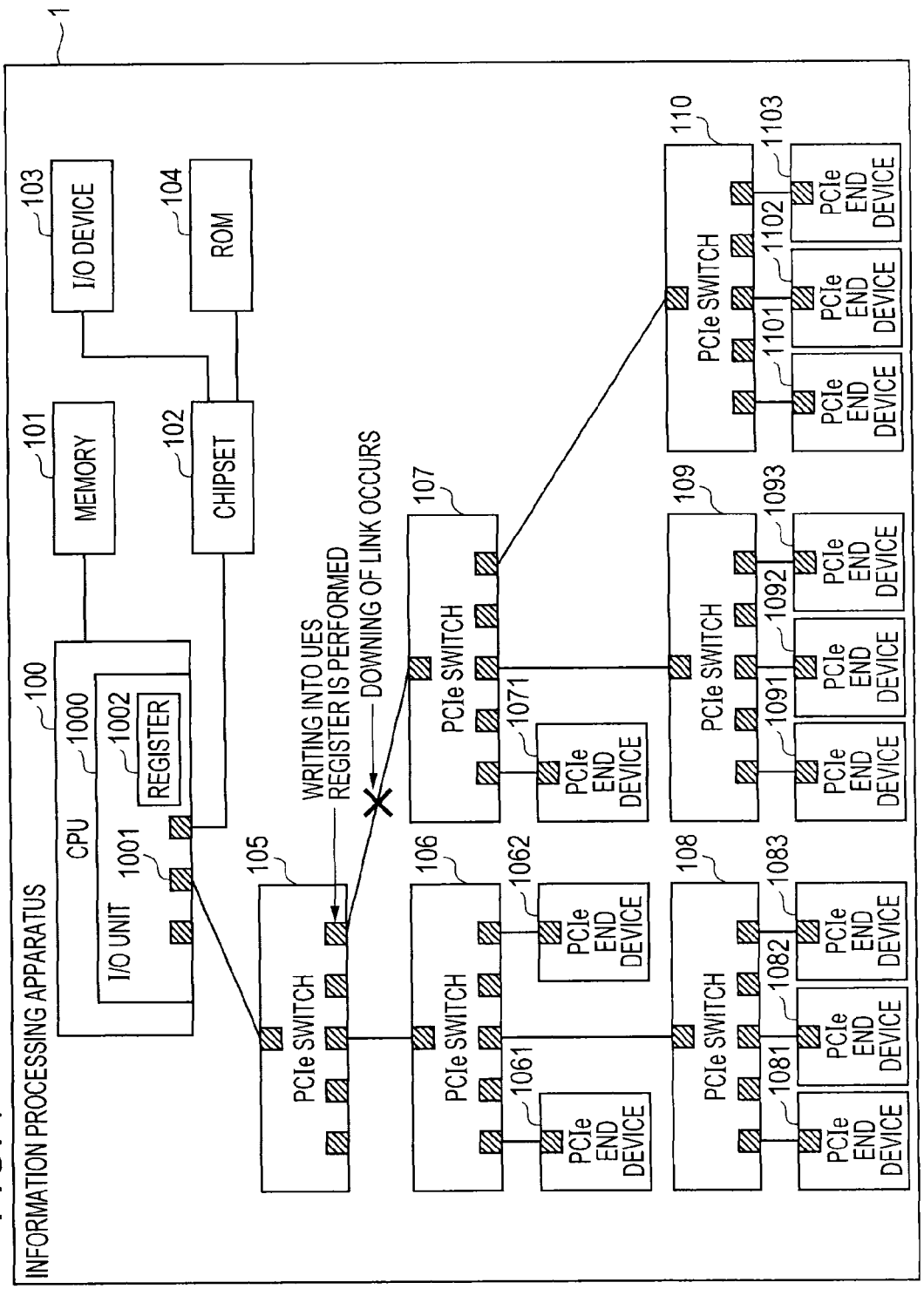
FIG. 7 is a diagram illustrating an example of a relationship between an occurrence of an error and writing into a UES register, according to an embodiment.
Figure 8:
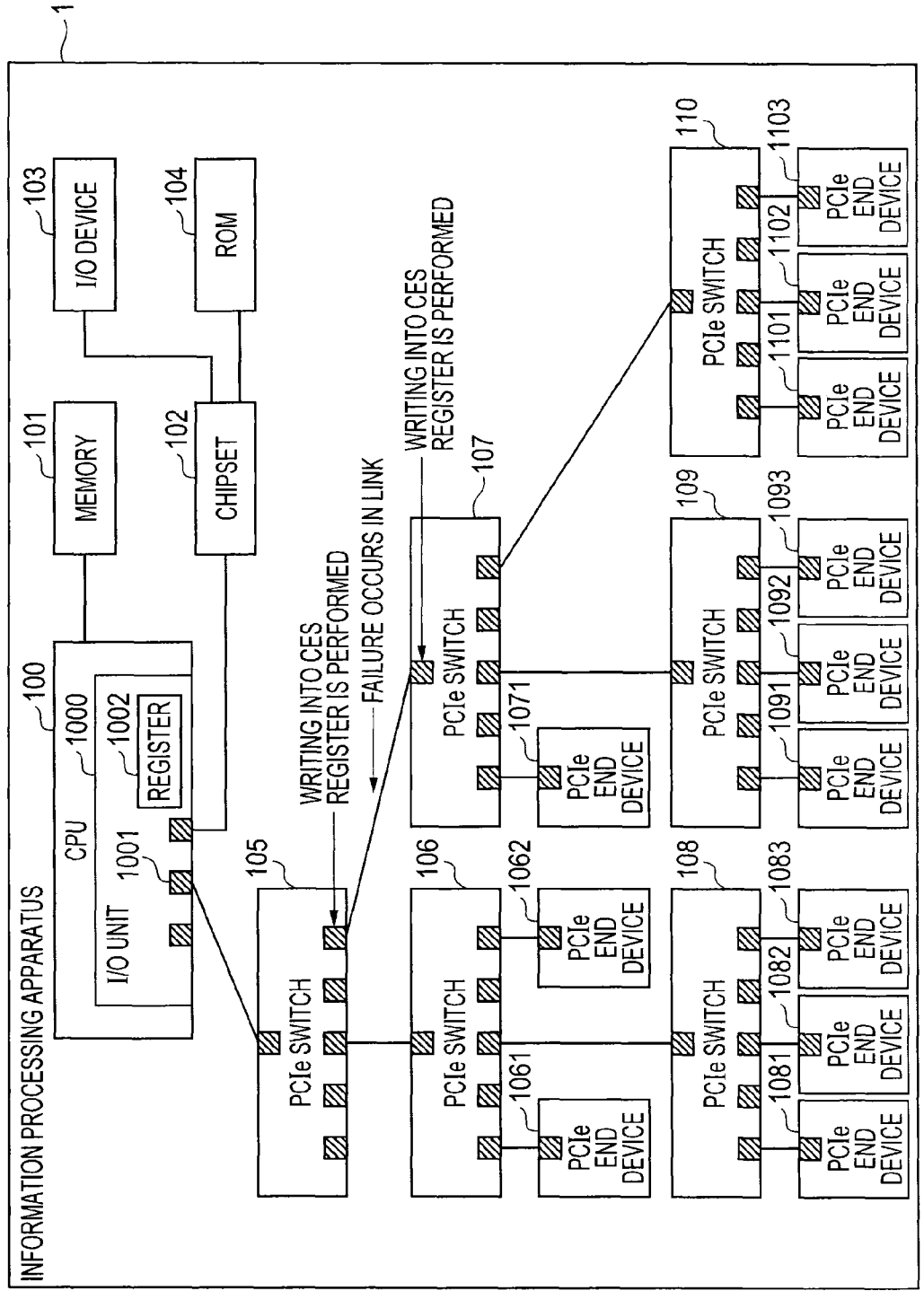
FIG. 8 is a diagram illustrating an example of a relationship between an occurrence of an error and writing into a CES register, according to an embodiment.

Relationships between an occurrence of an error and writing into the UES register 1201 and the CES register 1202 are described with reference to FIGS. 6 to 8.

First, a relationship between an occurrence of a completion timeout error and writing into the UES register 1201 is described with reference to FIG. 6. In FIG. 6, it is assumed that a TLP completion for a TLP request, which has been transmitted by the route port 1001, is not sent back within a certain time period in a case where the requester is the route port 1001 and the completer is the PCIe end device 1071.

In this case, the value of "Completion Timeout Error" in the UES register 1201 of the route port 1001 is set at 1. However, it is not necessarily the case that the completion timeout error is caused by the route port 1001, and the completion timeout error may be caused by the PCIe end device 1071, the PCIe device on the path between the route port 1001 and the PCIe end device 1071, or a link on the path, instead of the route port 1001.

A relationship between a down state of a link and writing into the UES register 1201 is described below with reference to FIG. 7. In FIG. 7, it is assumed that a link between the PCIe switch 105 and the PCIe switch 107 has entered a down state in a case where the requester is the route port 1001 and the completer is the PCIe end device 1071.

In this case, the value of "Surprise Down Error Status" in the UES register 1201 of a port that is connected to the link in a down state from among the ports of the PCIe switch 105 is set at 1. In this case, it is highly probable that the link itself in a down state (for example, a PCIe cable or the like) is the cause.

A relationship between an error of a link and writing into the CES register 1202 is described below with reference to FIG. 8. Here, "error of a link" indicates an error that is correctable by the PCIe device, and indicates that the link is not in a down state, but there is some impairment in the link due to problems regarding the PCIe cable or the fitting of the PCIe device, or the like. In FIG. 8, it is assumed that an error occurs in the link between the PCIe switch 105 and the PCIe switch 107 in a case where the requester is the route port 1001 and the completer is the PCIe end device 1071.

In this case, writing is performed into a CES register 1202 of one of the ports of the PCIe switch 105, which is connected to the link in which the error has occurred, and a CES register 1202 of one of the ports of the PCIe switch 107, which is connected to the link in which the error has occurred. For example, the value of "Replay Timer Timeout Status" and the value of "REPLAY_NUM Rollover Status" in the CES register 1202 of the port on the packet transmission side, and the value of "Receiver Error Status", the value of "Bad TLP Status", and the value of "Bad DLLP Status" in the CES register 1202 of the port on the packet reception side are set at 1.

The processing executed by the information processing apparatus 1 is described below with reference to FIGS. 9 to 12. First, it is assumed that an uncorrectable error has occurred in the information processing apparatus 1. Here, the interrupt processing unit 1003 detects that an uncorrectable error has occurred in the route port 1001 or the device under the control of the route port 1001 (FIG. 9: Step S1). The interrupt processing unit 1003 requests the UES register read unit 1004 to start the processing, and notifies the UES register read unit 1004 of identification information of a route port, which has been read from the register 1002.

The UES register read unit 1004 reads pieces of data from the UES registers 1201 of the route port 1001 and all of the PCIe devices under the control of the route port 1001 (Step S3). The read data is stored, for example, in the memory 101.

The UES register read unit 1004 determines whether or not the bit of "Uncorrectable Internal Error Status" is 1 in at least one of the route port 1001 and all of the PCIe devices under the control of the route port 1001 (Step S5).

When the bit of "Uncorrectable Internal Error Status" is 1 in at least one of the route port 1001 and all of the PCIe devices under the control of the route port 1001 (Step S5: Yes route), the UES register read unit 1004 notifies the identification unit 1006 of the pieces of read data. After that, the identification unit 1006 identifies at least one location that has caused "Uncorrectable Internal Error Status" (Step S7), and stores identification information or the like of the identified location in the memory 101. In Step S7, the route port 1001 or the PCIe device that includes the UES register 1201 in which the bit of "Uncorrectable Internal Error Status" is 1 is identified.

When the bit of "Uncorrectable Internal Error Status" is not 1 in any one of the route port 1001 and all of the PCIe devices under the control of the route port 1001 (Step S5: No route), the UES register read unit 1004 determines whether or not the bit of "Surprise Down Error Status" is 1 in at least one of the route port 1001 and all of the PCIe devices under the control of the route port 1001 (Step S9).

When the bit of "Surprise Down Error Status" is 1 in at least one of the route port 1001 and all of the PCIe devices under the control of the route port 1001 (Step S9: Yes route), the UES register read unit 1004 notifies the identification unit 1006 of the pieces of read data. After that, the identification unit 1006 identifies at least one location that has caused "Surprise Down Error Status" (Step S11), and stores identification information or the like of the identified location in the memory 101. In Step S11, a link connected a port having the UES register 1201 whose bit of "Surprise Down Error Status" is 1 (that is, the link is in a down state) is identified.

When the bit of "Surprise Down Error Status" is not 1 in any one of the route port 1001 and all of the PCIe devices under the control of the route port 1001 (Step S9: No route), the UES register read unit 1004 determines whether or not the bit of "Unsupported Request Error Status" is 1 in at least one of the route port 1001 and all of the PCIe devices under the control of the route port 1001 (Step S13).

When the bit of "Unsupported Request Error Status" is 1 in at least one of the route port 1001 and all of the PCIe devices under the control of the route port 1001 (Step S13: Yes route), the UES register read unit 1004 notifies the identification unit 1006 of the piece of read data. After that, the identification unit 1006 identifies at least one location that has caused "Unsupported Request Error Status" (Step S15), and stores identification information or the like of the identified location in the memory 101. In Step S15, for example, a requester is identified based on the header of a TLP request which has been stored in a header log register provided for a completer.

When the bit of "Unsupported Request Error Status" is not 1 in any one of the route port 1001 and all of the PCIe devices under the control of the route port 1001 (Step S13: No route), the UES register read unit 1004 determines whether or not the bit of "Completion Timeout Status" is 1 in at least one of the route port 1001 and all of the PCIe devices under the control of the route port 1001 (Step S17).

When the bit of "Completion Timeout Status" is not 1 in any one of the route port 1001 and all of the PCIe devices under the control of the route port 1001 (Step S17: No route), the flow proceeds to processing of Step S21.

When the bit of "Completion Timeout Status" is 1 in at least one of the route port 1001 and all of the PCIe devices under the control of the route port 1001 (Step S17: Yes route), the UES register read unit 1004 notifies the identification unit 1006 of the pieces of read data. After that, the identification unit 1006 executes identification processing (Step S19). The identification processing is described below with reference to FIG. 10.

Figure 10:
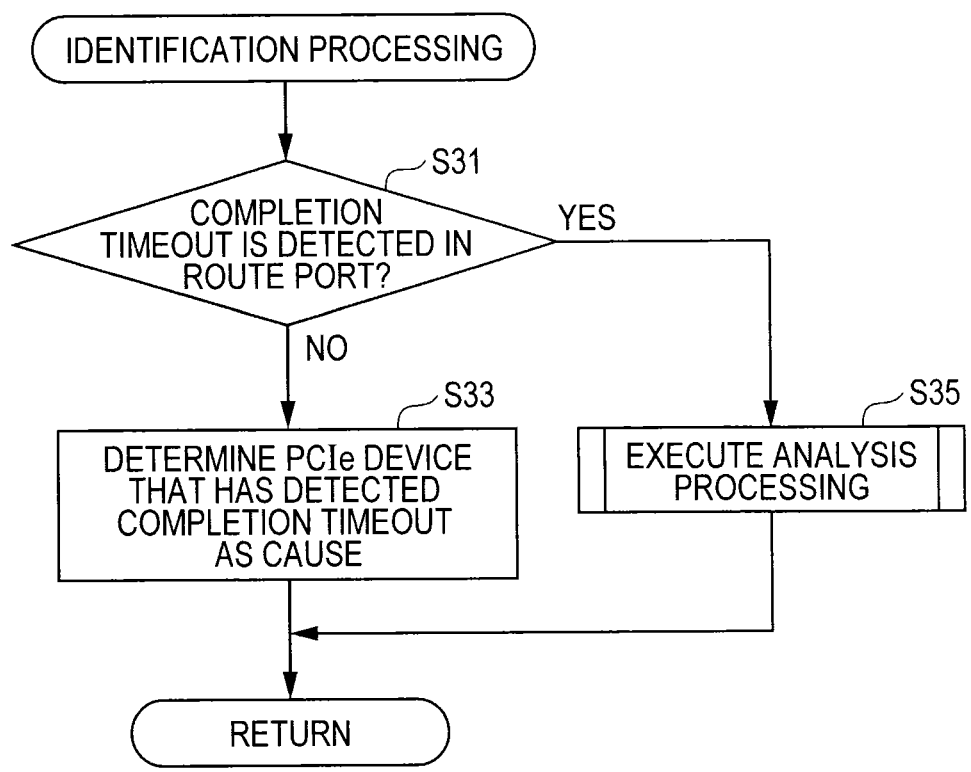
FIG. 10 is a diagram illustrating an example of an operational flowchart for identification processing, according to an embodiment.
Figure 11:
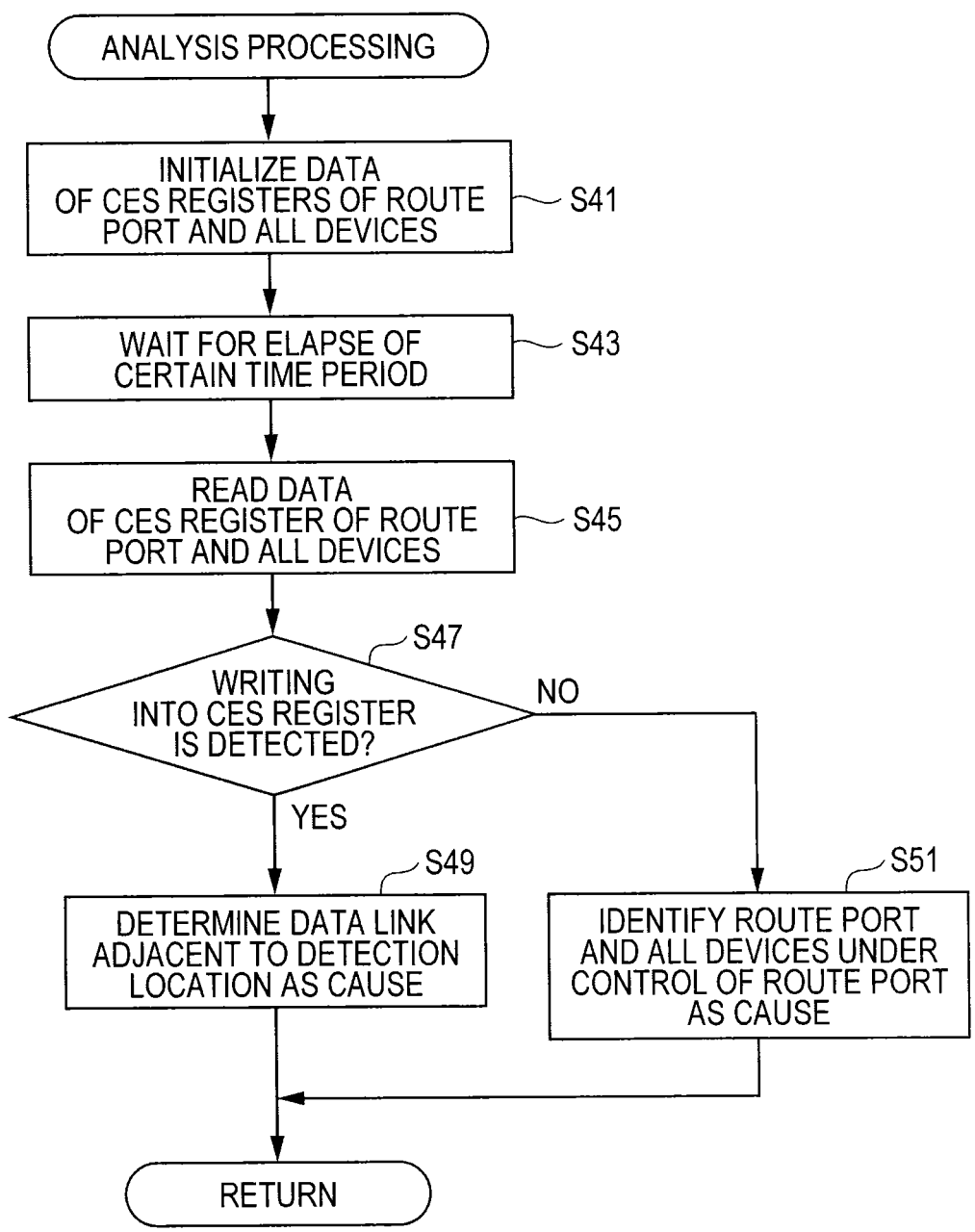
FIG. 11 is a diagram illustrating an example of an operational flowchart for analysis processing, according to an embodiment.

First, the identification unit 1006 determines whether or not a completion timeout is detected in the route port 1001 (that is, determines whether or not the bit of "Completion Timeout Status" is 1 in the UES register 1201 of the route port 1001) (FIG. 10: Step S31).

When the completion timeout is not detected in the route port 1001 (Step S31: No route), the identification unit 1006 determines a PCIe device in which the completion timeout has been detected as a cause of the completion timeout (Step S33). After that, the identification unit 1006 stores identification information or the like of the PCIe device in which the completion timeout has been detected, in the memory 101.

There is a possibility that the cause of the completion timeout is a PCIe device other than the PCIe device in which the completion timeout has been detected, or a link. However, in the embodiment, in consideration of the possibility that the PCIe device in which the completion timeout has been detected corresponds to the cause, and man-hours required for replacement and recovery of the PCIe device, the PCIe device in which the completion timeout has been detected is determined as the cause.

On the other hand, when the completion timeout has been detected in the route port 1001 (Step S31: Yes route), the identification unit 1006 executes analysis processing (Step S35). The analysis processing is described with reference to FIG. 11.

First, the identification unit 1006 requests the CES register initialization unit 1007 to start the processing. In response to the request, the CES register initialization unit 1007 initializes pieces of data of the CES registers 1202 of the route port 1001 and all of the PCIe devices under the control of the route port 1001 (here, performs setting of a value that indicates that there exists no error (for example, 0)) (FIG. 11: Step S41).

In the CES register 1202, information on a correctable error that has occurred after the last initialization was performed (for example, after the information processing apparatus 1 was operated for the first time) is left. Therefore, when the processing of Step S41 is executed, a record of an error that is not related to the completion timeout is removed, and identification of a link in which an error not related to the completion timeout has occurred is avoided.

The CES register initialization unit 1007 requests the CES register read unit 1008 to start the processing. The CES register read unit 1008 waits for an elapse of a certain time period (for example, one second) after the request from the CES register initialization unit 1007 was received (Step S43).

When the certain time period has elapsed, the CES register read unit 1008 reads the pieces of data of the CES registers 1202 of the route port 1001 and all of the PCIe devices under the control of the route port 1001 (Step S45), and notifies the identification unit 1006 of the pieces of data.

In the processing of Step S45, since a TLP request is transferred to all of the PCIe devices, it is possible that writing into the CES register 1202 of a port connected to an impaired link is performed. The impaired link may be identified as described above, but the impaired link may be identified more reliably after the certain time period has elapsed in Step S43. This is why there is a case in which the state of the impaired link turns into a sleep state during the certain time period. When the processing of Step S45 is executed after the state of the impaired link has turned into the sleep state, since re-training or the like of the impaired link (that is, re-execution of link training) is performed, there is a high possibility that writing into the CES register 1202 is performed at that time.

In a case where a requester and a completer are identified in advance, in Steps S41 and S45, only PCIe devices that are related to a TLP request and a TLP completion may be initialized and read as targets.

The identification unit 1006 determines whether or not writing into the CES register 1202 has been performed, using the data that has been read from the CES register 1202 (Step S47). In Step S47, it is determined whether or not the value of "Receiver Error Status" in the physical layer, and the value of "Replay Timer Timeout Status", the value of "REPLAY_NUM Rollover Status", the value of "Bad TLP Status", or the value of "Bad DLLP Status" in the data link layer is set at 1 in at least one of the CES registers 1202.

When writing into the CES register 1202 has been detected (Step S47: Yes route), the identification unit 1006 identifies a link connected to the PCIe device having the CES register 1202 into which the writing has been performed (that is, a link in which an error has occurred) (Step S49). After that, the identification unit 1006 stores identification information or the like of the identified link (alternatively, identification information or the like of the PCIe device connected to the link) in the memory 101.

When the writing into the CES register 1202 is not performed (Step S47: No route), the identification unit 1006 identifies the route port 1001 and all of the PCIe devices under the control of the route port 1001 as suspected locations (Step S51). After that, the identification unit 1006 stores the identification information or the like of the route port 1001 and all of the PCIe devices under the control of the route port 1001, in the memory 101. After that, the flow returns to processing of the caller of this processing.

In a case where an error of a link has occurred, even when a down state of a link is avoided by automatically correcting the error by retransmission through the data link layer and re-training or the like of the link through the link physical layer, a completion timeout may occur. The above-described processing allows an impaired link that is a cause of the completion timeout to be identified. Specifically, when the completion timeout is detected in the route port 1001, a range by which the completion timeout is caused is wide, but a range for identifying the cause may be narrowed according to the embodiment.

After that, the identification unit 1006 performs output of the identification information or the like that is stored in the memory 101 (for example, displays the identification information or the like on a display screen of the information processing apparatus 1). For example, output of the data as illustrated in FIG. 12 is performed. In the example of FIG. 12, a time stamp, the severity of an error, the detection location of the error, and information indicating the content of the error is output. When the information as illustrated in FIG. 12 is output (for example, the information is displayed on the display screen of the information processing apparatus 1), an administrator or the like may recognize an occurrence cause of the error, and a PCIe device to be replaced, and the like.

Figure 9:
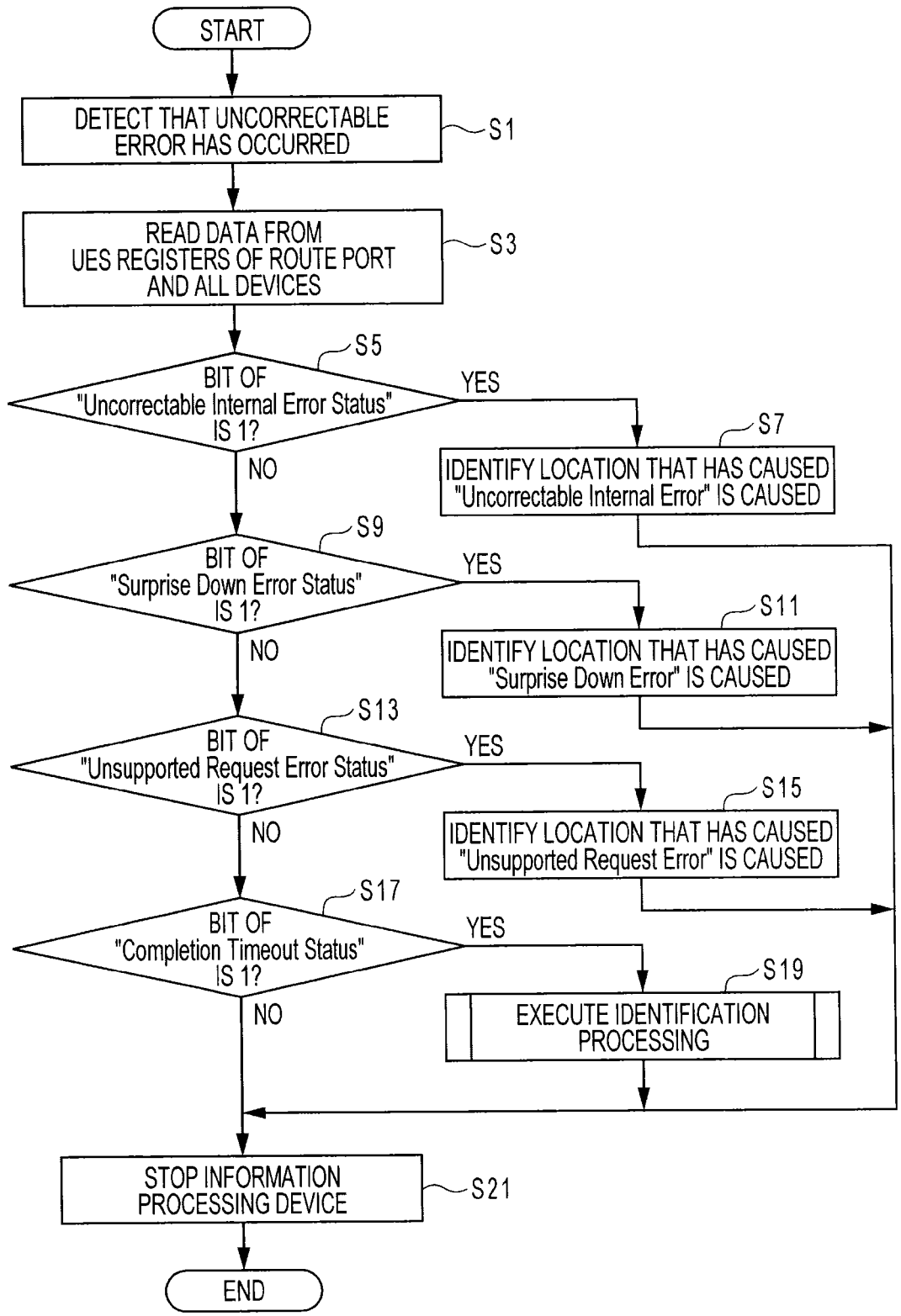
FIG. 9 is a diagram illustrating an example of an operational flowchart for main processing, according to an embodiment.

Returning to the description of FIG. 9, the stop processing unit 1005 executes processing of stopping the information processing apparatus 1 (Step S21). After that, the processing ends.

When the above-described processing is executed, the function of the information processing apparatus 1 may be recovered by exchanging the PCIe device to be replaced, and the information processing apparatus 1 may be resumed by the administrator. When the cause of the completion timeout is not narrowed, required man-hours become huge (for example, a work for replacing a large number of PCIe devices occurs). However, in the embodiment, the required man-hours are reduced, and the effect on the operation of the information processing apparatus 1 may be reduced.

A method of executing processing in which a correctable error is constantly-monitored is also conceivable. However, when errors in the physical layer and the data link layer occur frequently, the monitoring processing occupies communication of the CPU 100 and the PCIe device, thereby affecting the operation of the information processing apparatus 1. In addition, in order to avoid such an effect, complicated control is to be performed. However, in the method according to the embodiment, occurrence of such a problem may be avoided.

The embodiments are described above, but the technology discussed herein is not limited to such embodiments. For example, a function block configuration of the above-described information processing apparatus 1 may not be matched with an actual program module configuration.

In addition, the configuration of the above-described data holding method is merely an example, and the embodiment is not limited to the above-described configuration. In addition, also, in the processing flow, order of the pieces of processing may be changed as long as the processing result is not changed. Further to that, the pieces of processing may be executed in parallel.

In addition, the system of the PCIe is described above as an example, but the embodiment may be applied to another system which has a connection configuration similar to that of the above-described system and in which each connection point includes a status register.

In addition, as described above, reading is performed on the UES registers 1201 and the CES registers 1202 of all of the PCIe devices under the control of the route port 1001, but only PCIe devices that are related to a TLP request and a TLP completion may be regarded as targets. However, in this case, it is assumed that both of a requester and a completer are identified in advance by a certain method.

[Appendices]

The PCIe is described below with reference to the appendix.

1. Outline

The PCIe is an interface standard that follows a PCI bus standard and has been formulated by the PCI-SIG. In the PCI bus standard, the connection corresponds to a bus type, whereas in the PCIe, the connection corresponds to a Point to Point type. In addition, transfer of data is performed by handshake in the PCI bus standard, whereas transfer of data is performed by transmission and reception of a packet in a network in the PCIe.

A PCIe device includes a configuration space for each of functions, such as a route port, a port, and an end device, and the configuration space is used for an access to each function. The configuration spaces include the UES register 1201, the CES register 1202, and the header log register in which a packet at the time of an occurrence of an error is stored.

2. Layer of the PCIe

Figure 13:
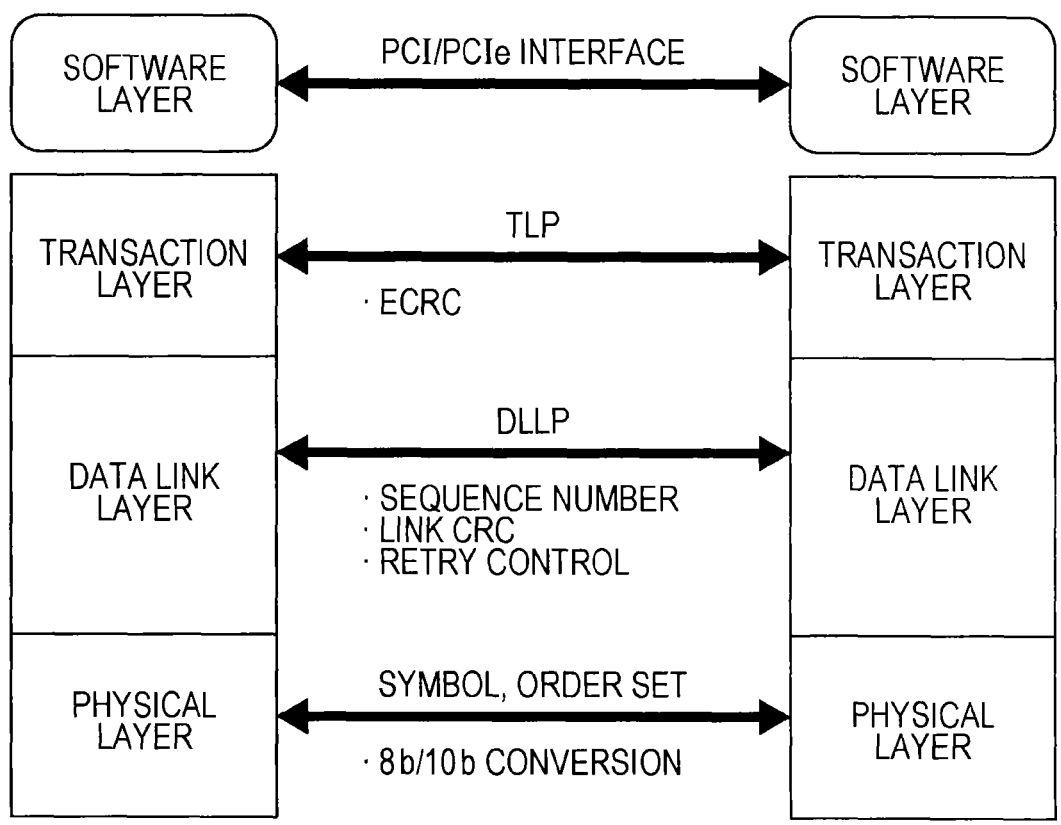
FIG. 13 is a diagram illustrating an example of a layer in a PCIe, according to an embodiment.

FIG. 13 illustrates a layer of the PCIe. As illustrated in FIG. 13, in the PCIe, a physical layer, a data link layer, a transaction layer, and a software layer are defined.

The physical layer includes a function that receives data from the data link layer, and transmits the data as a physical signal. Here, the physical layer converts 8 bit data, on which various pieces of processing have been performed by the upper layer, into 10 bit data, and then performs transmission of the data. The transmitted data includes a TLP and a Data Link Layer Packet (DLLP) of the upper layers, and a packet of the physical layer, which is called an ordered set. In addition, the physical layer receives a signal from a communicating party, and delivers the data to the data link layer. In addition, when the physical layer detects an invalid 10 bit symbol, the physical layer may notify the data link layer of invalidity of the received symbol as a Receiver Error.

The main purpose of the data link layer is to provide a scheme by which a TLP is appropriately exchanged between components that are connected to each other through the physical link. Therefore, to the DLLP, a sequence number and Link Cyclic Redundancy Check (LCRC) in the TLP are assigned. The PCIe device that has received the packet refers to the LCRC and the sequence number, and confirms that the TLPs have arrived in order of the sequence numbers. When a TLP has missed due to an error, retry is performed for the recovery. In a case in which the delivery is not confirmed even when retransmission of the packet is performed, it is regarded that a link is not normal. In this case, the data link layer instructs the physical layer to perform re-training of the link. When the re-training of the link in the physical layer is failed, it is regarded that a down state of a link has occurred.

The main purpose of the transaction layer is to exchange a packet that is related to a TLP request (for example, write and read requests for the memory, the I/O, and the configuration space) and a notification or the like of an error between transaction layers, and provide a function that is compatible with the PCI, for upper-level software. The TLP request is transferred from a requester to a completer, and the completer sends a TLP completion back to the requester. Generally, a TLP is generated in a terminal PCIe device such as a PCIe end device or a route complex (that is, a device including a route port), and delivered to a destination PCIe device through a PCIe switch and the like. The connection between the transaction layer of the requester and the transaction layer of the completer is not a Point-to-Point type such as the data link layer, but an End-to-End type. In addition, in the transaction layer, Cyclic Redundancy Check (CRC) of a TLP, which is called End-to-end CRC (ECRC) is used.

The software layer is located on the upper level of the transaction layer, and corresponds to a Basic Input/Output System (BIOS), firmware, an Operating System (OS), a driver, an application, and the like.

3. Completion Timeout

In the PCI bus standard, delivery of a TLP is confirmed by assignment of a sequence number and LCRC in the data link layer, and retry using Ack and Nack. In addition, in the PCIe, in the transaction layer, buffer overflow of TLPs is avoided through flow control by credit. However, the flow control of the transaction layer is performed only between PCIe devices that are connected to each other through physical links. Therefore, the control is of a Point-to-Point type and not of an End-to-End type, and it is not intended to guarantee that the TLP has reached the destination. The flow control in the transaction layer of the PCIe is described, for example, in "2.6. Ordering and Receive Buffer Flow Control" of "PCI Express Base Specification Revision 3.0" (for example, http://www.pcisig.com/specifications/pciexpress/base3/).

That is, in the PCIe, delivery through one data link is guaranteed, but delivery through a plurality of data links is not guaranteed. Therefore, a TLP request and a TLP completion arrive up to at a recipient that is in the middle of the delivery, but may not arrive at the final recipient. Such a problem is likely to occur in a case of a large scale system in which PCIe switches are connected to each other at multiple stages.

As for such a problem, a completion timeout is defined in the PCIe. In the transaction layer of the requester, a time that has elapsed after transmission of a TLP request is monitored, and the completion timeout is detected in the requester when the elapsed time is longer than a certain time period. The completion timeout is not an error in a unit of transaction, but an error that is detected between the route port and the end device. That is, in the PCIe, the completion timeout is an error that is detected by the transaction layer in a unit of a device. In the software layer, a transaction in which the completion timeout has occurred may be identified.

In the PCIe, the severity may be defined for each error. Thus, the completion timeout may be treated as an error that hinders the operation of the system (Fatal Error), may be treated as an error the recovery from which is possible by processing of the software layer (Non-Fatal Error), or may not be treated as an error.

Therefore, the use of the device may be stopped immediately by notifying the software layer of the completion timeout as the Fatal Error. In addition, the software layer may perform retry of the transaction, and try the recovery by notifying the software layer of the completion timeout as the Non-Fatal Error. In addition, the transaction may be controlled by performing monitoring of a timeout and performing the retry through the software layer without notifying the software layer of the error.

The embodiments described above are summarized as follows.

A cause identification method according to an embodiment is executed by an information processing apparatus including a plurality of devices. In addition, the cause identification method causes a first device from among the plurality of devices to execute processing that includes: (A) when the first device fails to receive within a certain time period a response for a request that has been transmitted by the first device, obtaining, from relevant devices each related to at least one of transfer of the request and transfer of the response, information being stored in a memory of each of the relevant devices and indicating whether or not an error occurs in a link connected to each of the relevant devices, and (B) identifying a link in which the error has occurred or a device that is connected to the link, based on the obtained information.

For example, when a failure or the like occurs in a link, there is case in which a response is not received within a certain time period (that is, a timeout occurs). Therefore, a cause of the timeout may be identified by applying the above-described method.

In addition, in the processing of obtaining the information that indicates whether or not an error occurs in a link connected to the relevant devices, (a1) information indicating that an error does not occur in a link connected to each of the relevant devices is set to a memory of each of the relevant devices, and the information is obtained from the memory of the each relevant device after a time defined in advance elapses from the time point of the setting. There is a case in which information on an error that is not related to the timeout (for example, an error or the like that has already been rectified) is stored in the memory. In this case, an error that is not related to the timeout is not detected by mistake when the setting is performed as described above. In addition, an error that is related to the timeout is detected by communication at the time of obtaining information from the memory, and information that indicates that the error has occurred is stored in the memory. Therefore, an error that is not related to the timeout is removed, and an error that is related to the timeout may be detected by applying the above-described example.

In addition, the above-described information processing apparatus is a system of PCI Express, and the above-described first device is a CPU that includes a route port, and the above-described memory may be a first register that stores information on a correctable error. When a timeout is detected in the CPU that includes the route port, the route port, all end devices under the control of the route port, a link on the path, and the like become suspected locations, and a large amount of man-hours are required for identification of the cause. Applying the above-described method allows the cause of the timeout to be identified easily.

In addition, the cause identification method causes the above-described first device to execute the processing further including: (C) determining a second device that is an end device of PCI Express from among the plurality of devices as a cause when it is detected that the second device fails to receive within a certain time period a response for a request that is transmitted by the second device. When a timeout is detected in the end device, it is highly probable that the end device itself is the cause of the timeout, as compared with the case where a timeout is detected in the CPU including the route port. In this way, appropriate measures may be taken by applying the above-described method.

In addition, each of the above-described plurality of devices includes a second register that stores information on an uncorrectable error, and in the processing of determining the second device as the cause, (c1) a device that does not receive a response within a certain time period is detected from among the plurality of devices, based on the information that is stored in the second register. In the PCI Express, the timeout (for example, the completion timeout) is detected as an uncorrectable error. Thus, the timeout may be detected appropriately by applying the above-described method.

A program may be created that is used to cause a processor to execute the processing by the above-described method, and the program is stored, for example, in a computer-readable storage medium or storage device, such as a flexible disk, a CD-ROM, a magneto-optical disk, a semiconductor memory, or a hard disk. An intermediate processing result is temporarily stored in a storage device such as a main memory.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method performed by a first device among a plurality of devices within an information processing apparatus, the method comprising:
   when the first device fails to receive within a first time period a response for a request that has been transmitted by the first device, obtaining link-status information from relevant devices each related to at least one of transfer of the request and transfer of the response, the link-status information being stored in a memory of each of the relevant devices and indicating whether or not an error occurs in a link coupled to each of the relevant devices; and
   identifying a link in which the error has occurred or a device that is coupled to the link, based on the obtained link-status information, wherein
   the obtaining the link-status information from the relevant devices includes:
      setting initial information indicating that an error does not occur in a link coupled to each of the relevant devices, to a memory of each of the relevant devices; and
      obtaining the link-status information from a memory of each of the relevant devices after a second time period elapses from a time point of the setting the initial information.

2. The method of claim 1, wherein
the information processing apparatus is a system of PCI Express,
the first device is a CPU that includes a route port, and
the memory is a first register that stores information on a correctable error.

3. The method of claim 2, further comprising:
   determining a second device that is an end device of PCI Express among the plurality of devices as a cause when it is detected that the second device fails to receive within the first time period a response for a request that has been transmitted by the second device.

4. The method of claim 3, wherein
each of the plurality of devices includes a second register configured to store information on an uncorrectable error; and
the second device is determined from among the plurality of devices, based on information stored in the second registers.

5. A system comprising:
a plurality of devices each including a memory and a processor coupled to the memory, wherein
the memory stores link-status information indicating whether or not an error occurs in a link coupled to the each device, and
the processor of a first device among the plurality of devices is configured to:
   obtain, when the first device fails to receive within a first time period a response for a request that has been transmitted by the first device, the link-status information from relevant devices each related to at least one of transfer of the request and transfer of the response,
   identify a link in which the error has occurred or a device that is coupled to the link, based on the obtained link-status information, wherein
the processor obtains the link-status information from the relevant devices by setting initial information indicating that an error does not occur in a link coupled to each of the relevant devices, to a memory of each of the relevant devices, and obtaining the link-status information from the memory of each of the relevant devices after a second time period elapses from a time point of the setting the initial information.

6. A non-transitory, computer-readable recording medium having stored therein a program for causing a computer to execute a process, the computer being included in a first device among a plurality of devices, the process comprising:
   when the first device fails to receive within a first period a response for a request that has been transmitted by the first device, obtaining link-status information from relevant devices each related to at least one of transfer of the request and transfer of the response, the link-status information being stored in a memory of each of the relevant devices and indicating whether or not an error occurs in a link coupled to each of the relevant devices; and
   identifying a link in which the error has occurred or a device that is coupled to the link, based on the obtained link-status information, wherein
   the obtaining the link-status information from the relevant devices includes:
      setting initial information indicating that an error does not occur in a link coupled to each of the relevant devices, to a memory of each of the relevant devices; and
      obtaining the link-status information from a memory of each of the relevant devices after a second time period elapses from a time point of the setting the initial information.

* * * * *